United States Patent
Lattimore

(10) Patent No.: US 8,408,843 B2
(45) Date of Patent: Apr. 2, 2013

(54) SYSTEM AND METHOD FOR FACILITATING UNDERGROUND COMMUNICATION CABLE INSTALLATION UTILIZING SOIL EROSION TECHNIQUES

(75) Inventor: Michael C. Lattimore, Tampa, FL (US)

(73) Assignee: Verizon Florida LLC, Tampa, FL (US)

( * ) Notice: Subject to any disclaimer, the term of this patent is extended or adjusted under 35 U.S.C. 154(b) by 469 days.

(21) Appl. No.: 12/173,477

(22) Filed: Jul. 15, 2008

(65) Prior Publication Data

US 2010/0014921 A1 Jan. 21, 2010

(51) Int. Cl.
*E21B 7/18* (2006.01)
(52) U.S. Cl. .......................................... 405/184; 175/67
(58) Field of Classification Search ................ 405/174, 405/183.5, 184, 184.1, 184.2, 184.3, 184.4, 405/184.5; 175/61, 67, 73, 424
See application file for complete search history.

(56) References Cited

U.S. PATENT DOCUMENTS

| | | | | |
|---|---|---|---|---|
| 2,274,431 A * | 2/1942 | Renner | ........................ | 173/197 |
| 3,536,151 A * | 10/1970 | Aarup | .......................... | 175/424 |
| 3,638,741 A * | 2/1972 | Zizak | ............................. | 175/215 |
| 3,720,272 A * | 3/1973 | Hunter | ............................. | 175/61 |
| 4,135,586 A * | 1/1979 | Cherrington | .................. | 173/147 |
| 4,501,513 A * | 2/1985 | Warner et al. | ................. | 405/184 |
| 5,423,388 A * | 6/1995 | Hale | ............................... | 175/74 |
| 5,725,059 A * | 3/1998 | Kuckes et al. | .................. | 175/45 |
| 2008/0011520 A1 * | 1/2008 | Welter | .......................... | 175/424 |

* cited by examiner

*Primary Examiner* — Sunil Singh

(57) ABSTRACT

A technique for aiding an underground communications cable installer in the installation such cable in underground utilities neighborhoods. The technique manages the problem presented by a surface-visible, underground-pathway obstruction such as a sidewalk, which lies across the path of installation. The technique, or method, is useful with any kind of cable, such as fiberoptic cable or copper wire cable. Hydraulic water pressure is applied through a biased, flexible conduit to erode a pathway under the obstruction from ground surface on one side to ground surface on the opposite side of the obstruction, thereby forming a tunnel under the obstruction through which the cable can be easily pulled. In alternative embodiments, the cable can be inserted directly into and through the conduit while it is underground, the conduit then acting as a sleeve for the cable which is subsequently removed prior to burying the cable in a trench dug from street-located handhole to house. Special apparatus connects a water hose to the flexible conduit (PVC plastic) to provide watertight operation while allowing manual flow control.

17 Claims, 5 Drawing Sheets

SYSTEM AND METHOD FOR FACILITATING UNDERGROUND COMMUNICATION CABLE INSTALLATION UTILIZING SOIL EROSION TECHNIQUES

BACKGROUND

It is not uncommon today to find residential neighborhoods which have underground utilities, in addition to the usual underground water/sewer service. In these neighborhoods, the electric, gas, and communication services (telephone, fax, cable television, Internet, etc.) are all installed underground, and there are no upright power poles to be seen. There are advantages to underground utility services. For example, in high wind storms, or ice storms, in an underground utility neighborhood, there are no power poles or wires subject to high wind and/or ice damage and/or collapse.

In these neighborhoods, when a new communication cable is to be connected, for example, to a particular residence, that cable is buried in a trench in the ground typically between a "hand-hole" located near the street and the particular residence to which the cable is to be connected. The depth of the trench is typically seven inches, or so. Obviously, buried cable installation is not limited to single family dwellings and it can be applied to apartment buildings as well as to non-residential buildings such as industrial buildings.

These trenches are usually dug by hand, at least for individual residences. In the course of digging these trenches for cable installation, such as fiber optic cable or copper-wire cable installation, it is not unusual to be confronted with an immovable obstacle such as a concrete sidewalk, a stone wall, a series of large rocks in the nature of a wall, decorative landscape concrete edgings, etc. These are problematic situations that slow down any underground installation process, and the cable installer must come up with a "work-around" (or, more precisely, a "work-under") solution to the obstacle problem. There is a need for an easily applied and effective solution to this underground-pathway obstruction problem and the disclosed subject matter of the instant application teaches and claims such a solution.

DETAILED DESCRIPTION OF PREFERRED EMBODIMENTS

Figure 1:
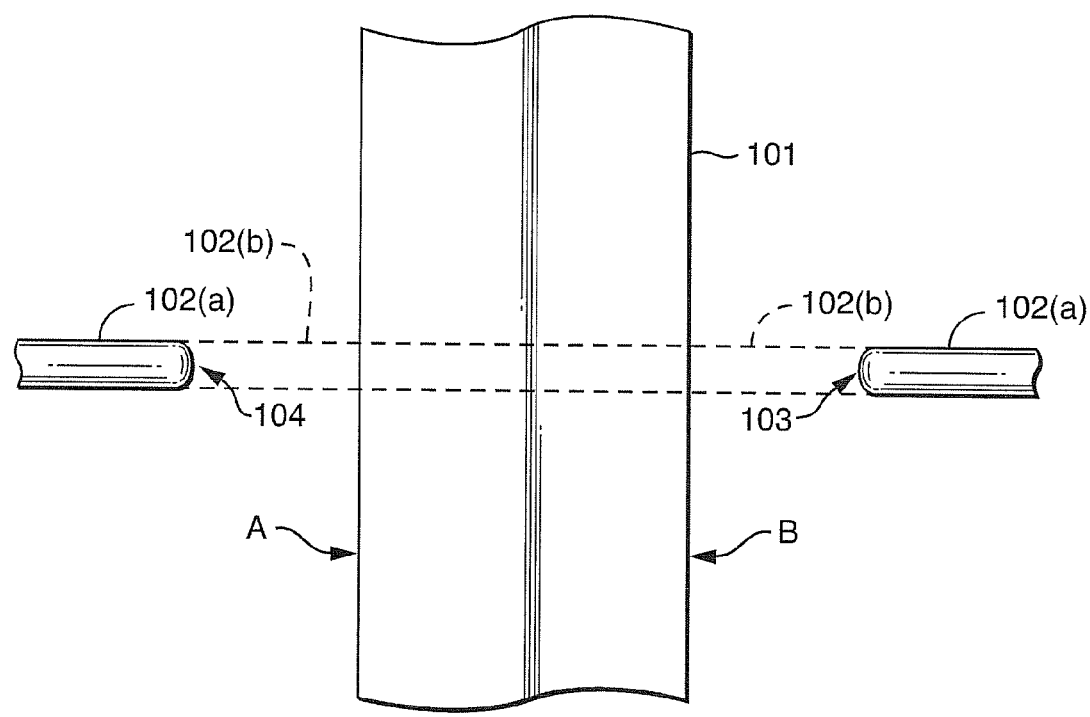
FIG. 1 is a schematic top view of an exemplary surface-visible, underground-pathway-obstruction such as a sidewalk with a flexible conduit positioned there-under.

In this description, the same reference numeral in different Figs. is referring to the same entity. Reference numerals of each Fig. start with the same number as the number of that Fig. For example, FIG. 3 has numerals in the "300" category and FIG. 4 has numerals in the "400" category, etc. Thus, if discussing an entity in a Fig. having a particular reference numeral not starting with the same number as that Fig. one can easily refer back to the appropriate Fig.

Exemplary embodiments include system and method for facilitating underground installation of communication cable such as fiberoptic cable or copper wire cable. If an obstruction, such as a sidewalk, is encountered crossing paths with an intended trench path in which communication cable is intended to be buried, the systems and methods permit the erosion, or washing-away, or loosening-up, of soil underneath the sidewalk, along an intended underground route, through which the communication cable is passed.

In other words, a trench may first be hand-formed starting from the location of a communication signal source, such as, for example, a hand-hole located at the street in front of a residence, to the first-encountered side of the sidewalk obstruction. The trench is continued from the other side of the sidewalk obstruction to the residence. Applicant's erosion, or hydraulic-pressure, technique, whereby the soil is loosened under the sidewalk along a particular underground route, permits the communication cable to be easily fed under the sidewalk through that loosened-up, or eroded, underground route or tunnel from the formed trench on one side of the sidewalk to the formed trench on the other side of the sidewalk. There is no requirement that the trench be formed prior to the underground route or pathway under the sidewalk, and the underground pathway can be formed first.

FIG. 1 is a schematic top view of a surface-visible, underground-pathway-obstruction such as a sidewalk with a flexible conduit positioned there-under according to an exemplary embodiment. Sidewalk 101 represents a surface-visible obstruction to a trench (trench not shown in this Fig.). In other words, sidewalk 101 prevents a continuous trench, approximately 6-12 inches deep, from being dug, usually by hand using shovels or similar tools, from one side, e.g., side "A" of sidewalk 101 to side "B" thereof.

Flexible conduit identified as 102(a) and 102(b) is a continuous conduit with sections 102(a) lying on top of the ground, one section on either side of the sidewalk, and with sections 102(b) lying under the ground and depicted in dashed-line-format. Sections 102(b) also pass underneath sidewalk 101. Therefore, locations 103 and 104 signify the two places where above-ground conduit section 102(a) transitions to below ground conduit section 102(b). This depicts the conduit after it has been passed under the sidewalk.

Figure 2:
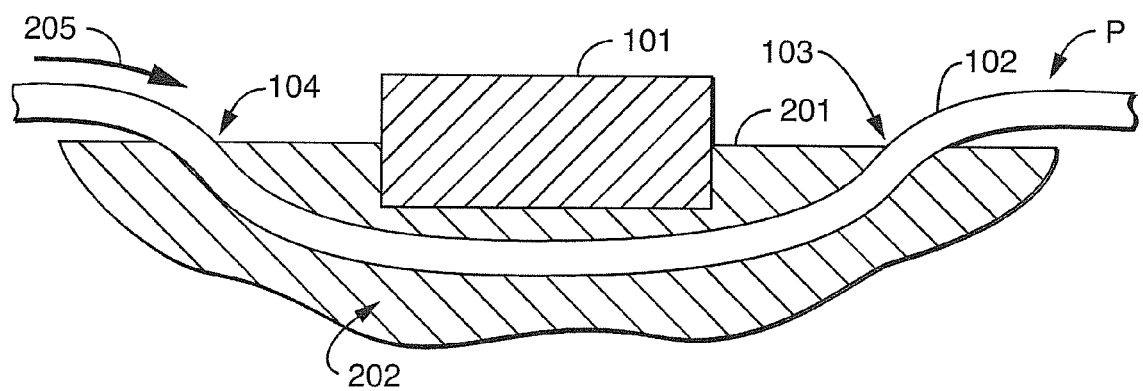
FIG. 2 is a schematic elevation front view of an exemplary cross-section of the sidewalk of FIG. 1, with a flexible conduit positioned there-under.

Referring to FIG. 2, a schematic elevation front view of a cross-section of the sidewalk 101 of FIG. 1 is shown, exposing flexible conduit 102 which is positioned there-under according to an exemplary embodiment. Sidewalk 101 is shown as partially submerged below ground surface 201 into underground 202. Output end P of flexible conduit 102 is shown at the right of the drawing, the opposite end of the conduit being its input end. Input and output ends of the conduit are used in reference to inflow and outflow, respectively, of water therethrough, to be described below. Water flow direction 205 is shown.

Figure 3:
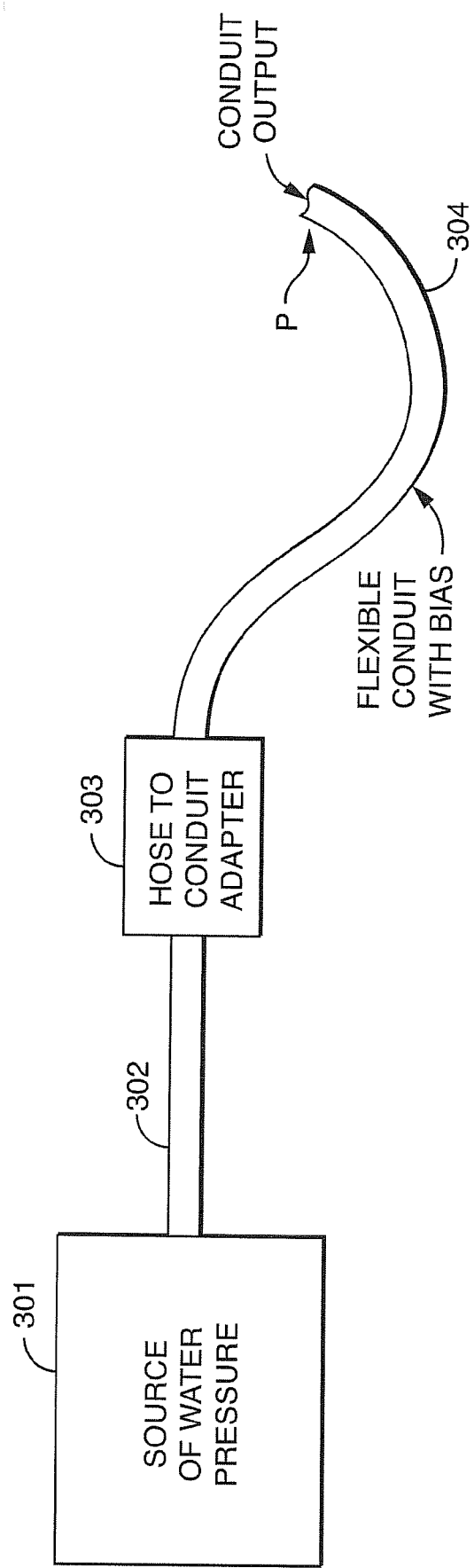
FIG. 3 is a functional block diagram of an exemplary system for configuring a pathway under a surface-visible, underground-pathway-obstruction.

FIG. 3 is a functional block diagram of a system for configuring a pathway under a surface-visible, underground-pathway-obstruction in accordance with according to an exemplary embodiment. A source of water pressure 301 is shown at the left of FIG. 3. This source can come from a home water supply which, in turn, receives water from a public source such as a municipal reservoir or from a private water source such as a well drilled on the property of that home.

The source of the water is not of particular significance, but the pressure of the water that is applied is relevant to their operational success. In other words, well-water pressure may be insufficient to allow efficient operation. But that pressure can be boosted by a mechanism (not shown) similar to that used for power-washing outdoor decks, house siding, etc., if needed. Typical water pressure from municipal supplies is generally adequate, but that pressure can also be increased by the same mechanism noted herein, if needed. The pressure needed for proper operation of embodiments disclosed herein is a function of the compactness of the soil to be eroded—the more compacted the soil such as hard clay, the more pressure required.

Water pressure source 301 is connected to a typical garden hose 302, which homeowners use for lawn-watering and other similar chores. The other end of that hose is connected to a hose-to-conduit-adapter 303 (hereinafter "adapter 303"). Adapter 303 connects to conduit 304 and forms a water-proof interface between the garden hose and conduit 304. Adapter 303 can be constructed from standard metal plumbing and/or plastic plumbing hardware. Adapter 303 can include a shutoff valve to be used by a cable installer to turn on/off water flow there-through.

Figure 4:
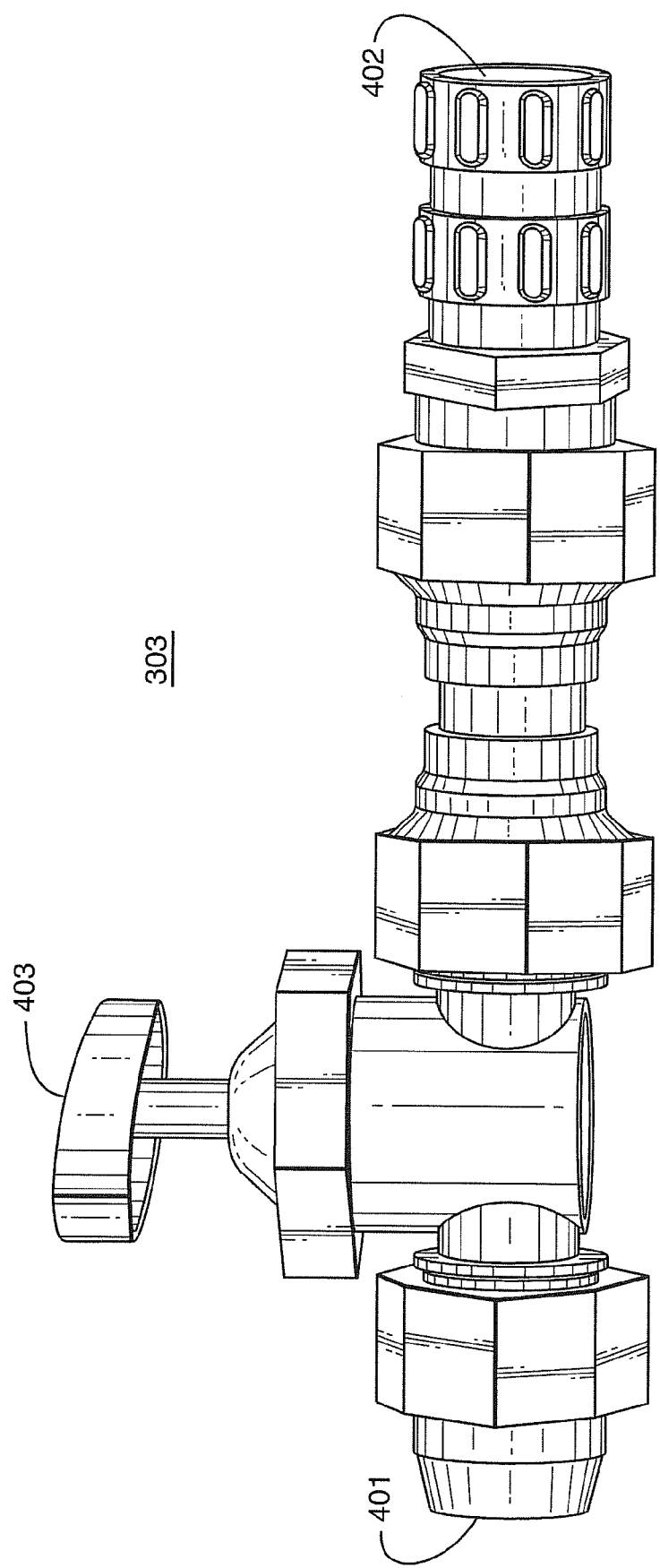
FIG. 4 is an exemplary schematic diagram of the hose to conduit adapter of FIG. 3

Detail of adapter 303 is shown in FIG. 4 which is an exemplary schematic diagram of the hose to conduit adapter of FIG. 3. Adapter 303 has typical garden hose coupling 401 on its left side for normal coupling to a standard garden hose. Adapter has compression fitting 402 on its right side, to properly engage and make water tight the interface between itself and flexible conduit 304. In addition adapter 303 has valve 403, manually adjustable, to control water flow and shut-off such flow if need be.

Returning to FIG. 3, conduit 304 may be formed from a flexible plastic tube having inner diameter similar to, or typically less than, the inner diameter of the garden hose to which it is attached by adapter 303. Conduit 304 is formed in a manner that gives it a permanent bias or curve; in other words, if lying flat on the ground without external constraint imposed on the conduit, it can assume a curve in the manner shown. In addition, other conduits can be brought to a job-site and made available for use by a cable installer, these other conduits having a more severe curve-bias, even to the extent that the conduit is "coiled." These various strengths of bias or curvature can be useful in different applications as a function of ground soil density actually encountered at a particular job site, distance to be traversed underground, and other factors. In other words, for a short underground distance, compared to the distance of a sidewalk width, and in a highly compacted soil, it may be advantageous to try a tightly-coiled conduit to achieve an underground path consistent with the size of the barrier in its path, as shall be more fully described below. The output end P of the conduit can be tipped with a rim of hard metal such as steel, and the rim can have a sharp cusp formed into it, the cusp pointing in the direction of water flow, to facilitate operation.

Briefly, in operation, an underground cable installation team may have certain team members who are responsible for digging the above-referenced trench and for traversing any ground surface obstacles that are encountered. When encountering an obstruction, e.g., a sidewalk, one of these team members, an installer, after connecting flexible conduit to a water supply, can grab flexible conduit 304 and press the sharp metal rim into the soil at one side of the sidewalk. The water can then be turned-on, allowing a pressure stream of water to be applied against the ground surface. Simultaneously, a steady force is applied by the installer to the flexible conduit, pushing against the soil. The conduit, thereby, follows the direction of the water stream which is eroding, or loosening, the soil in its path.

An experienced installer can guide, wiggle, push and/or orient the flexible conduit, thereby working the metal-rimmed output end of the conduit through the soaked underground soil until the metal rim pops-up through the ground surface on the opposite side of the sidewalk. Another variable under control of the installer is the water pressure, which can be increased/decreased to achieve the desired result. In the event that the flexible conduit passes under the sidewalk, but does not emerge on its own, the installer can always dig a hole on the opposite side of the sidewalk at the approximate place where the emergence was expected, and capture the conduit by that technique, as a last resort.

Figure 5:
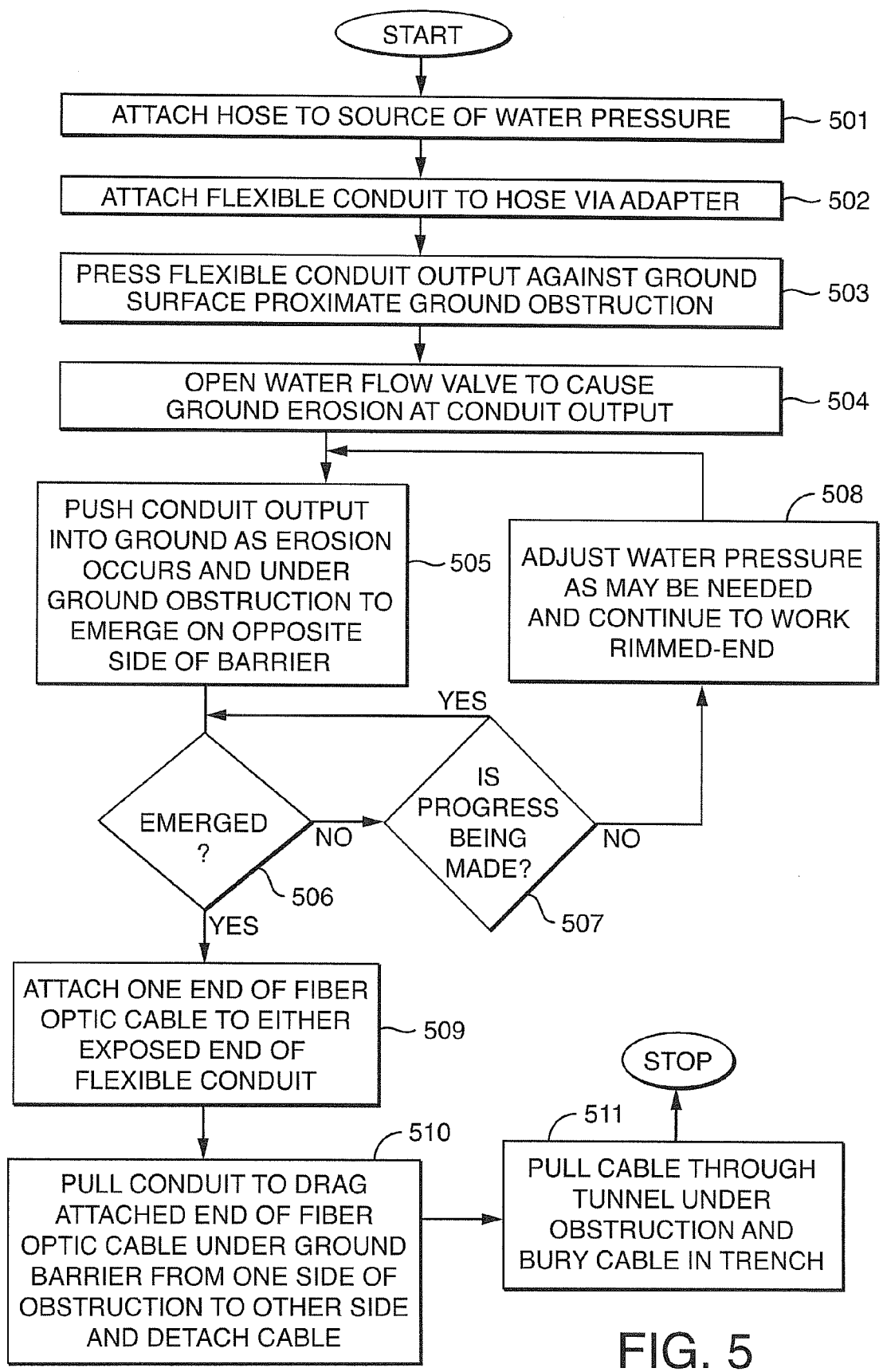
FIG. 5 is a flowchart depicting an exemplary method of fiberoptic or other cable underground installation.

FIG. 5 is a flowchart depicting the above-described method or technique of fiberoptic cable underground installation in more detail. In act 501, the installer attaches water hose 302 to source of water pressure 301. In act 502, the installer attaches flexible conduit 304 to the hose via adapter 303. In act 503, the installer presses the flexible conduit output and, in particular embodiments, the hard metal rim attached to the conduit output, against ground surface 201 nearby sidewalk 101. In act 504, someone opens a water flow valve, either at the dwelling on the property from which the water is supplied, or at the adapter 303, or both, to cause water flow through conduit 304 to penetrate the ground at the place where it is being pressed by the conduit output P.

In act 505, the installer works the conduit under the obstruction with intentions of achieving an emergence on the other side of the obstruction 101. In question box 506, the query is made: has the conduit emerged? If not, another question box 507 answers the question: is progress being made? If yes, a return to question box 506 occurs to query the emergence of the conduit end. But, if not, the algorithmic process moves to act 508 which allows, if needed, a pressure adjustment to the water supply; the flow can be increased by opening the garden hose to fully-open and/or a pressure washing apparatus (not shown) can be connected to the garden hose upstream from adapter 303 to radically increase available water pressure to loosen heavily compacted underground soil. After that, acts 505 and 506 are repeated to see if the conduit emerges.

If conduit 304 does emerge on the other side of the obstruction, then in act 509 one end of the fiber optic cable (or other telecommunications cable) that is being installed on this property is tied or lashed to the output end of the flexible conduit. In act 510, the installer pulls the conduit back out of the underground passage in the opposite direction from that in which it was inserted, thereby dragging the fiber optic cable into and through the underground tunnel or passage to the other side of the obstruction. Thus, the cable is now traversed under the obstruction and it can then be detached from the conduit. In act 511, the cable can then be pulled thereunder to whatever length is needed to make the appropriate optical or electrical connection from hand-hole to dwelling structure. If a trench has been dug, the cable is then appropriately buried in the trench, and if not, the trench is then dug at that time with cable burial following.

Figure 6:
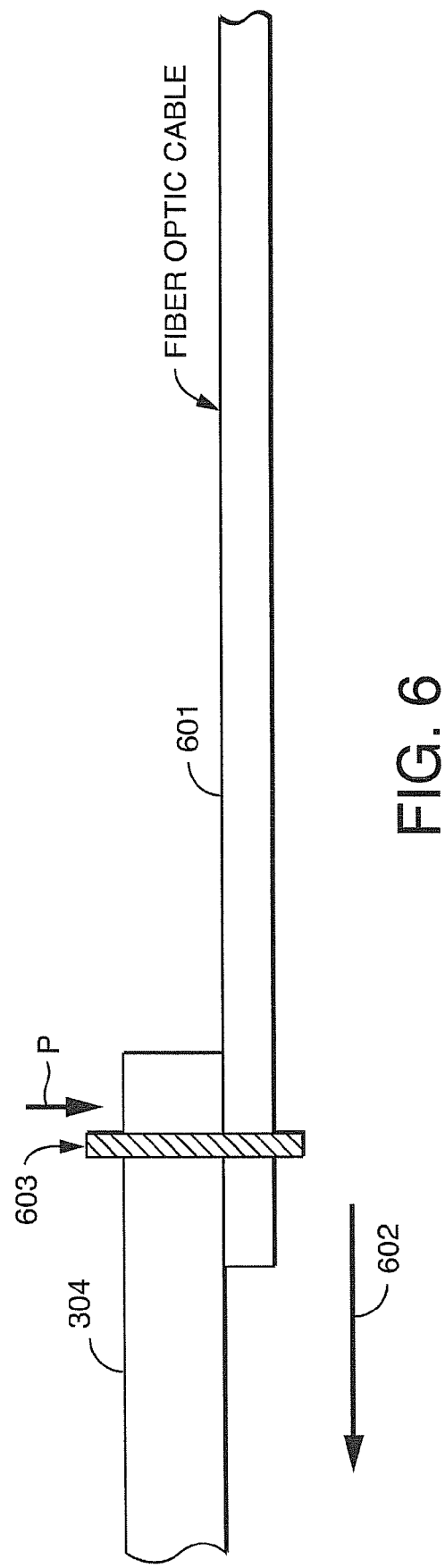
FIG. 6 is an exemplary schematic diagram showing how fiberoptic cable can be lashed for pulling it through a resultant tunnel fashioned under a ground surface obstruction.

FIG. 6 is a schematic diagram showing how fiberoptic cable can be lashed/tied for underground installation, in accordance with the description of the previous paragraph. FIG. 6 shows a portion of conduit 304 near its output end P, after it has emerged from underground per the discussion above. Fiber optic cable 601 is shown physically attached to conduit 304 by lashing or tie 603. Lashing 603 can be a twist wire-tie or made from nylon cord or from any other strong, suitable material. In addition, conduit 304 can be grooved near end P on its outer circumferential surface to form a frictional surface or a detent to facilitate the binding between the conduit and the cable. Alternatively, an adhesive tape, such as electrical insulating tape can be wound around the cable and conduit, tightly, to enable the pull-through operation to properly conclude. In this instance the direction of pull-through is direction 602 as shown in FIG. 6.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, in a first alternative technique, a fiberoptic or other cable can be attached to the flexible conduit at the adapter end, instead of at the conduit's output end, after removing the adapter, and the conduit can be pulled out of the underground tunnel in the same direction in which it was inserted, thereby dragging the fiberoptic cable behind it into and through the tunnel. In another alternative technique, where a copper-wire cable is being installed, after removal of the conduit from the hose-to-conduit-adapter 303, that cable can be inserted directly into and through the conduit itself, before the conduit is removed from its above and below ground position; after emergence of the copper wire cable, the conduit sleeve can then be pulled out of the ground, leaving the cable in proper place. Accordingly, the specification and drawings are accordingly to be regarded in an illustrative rather than restrictive sense.

What is claimed is:

1. A method, comprising:
   facilitating underground installation of communication cable by:
   connecting a controllable source of water to an input end of a continuous and flexible conduit having a permanent curve-bias curving said conduit, said conduit having a circumferential grooved frictional surface on the outside of said conduit near an output end of said conduit;
   placing said output end of said conduit at, and orienting said output end into, ground surface adjacent one side of an obstruction blocking a desired underground pathway for said underground installation;
   activating said controllable source of water to flow into said input end, said water having an input end water pressure, and out from said output end directly into said ground at substantially said input end water pressure which is sufficient pressure to cause erosion of said ground surface and ground beneath said ground surface;
   directing said conduit to cause a pathway of said erosion of said ground beneath said ground surface to follow an expected route under said obstruction, said expected route being shaped similarly to shape of said curved conduit, said permanent curve-bias being useful regarding distance traversed underground, said distance being consistent with size of said obstruction, until said conduit emerges from said ground surface adjacent the other side of said obstruction; and
   feeding said communication cable through said erosion pathway from said other side of said obstruction to said one side of said obstruction by lashing said grooved frictional surface fixedly to said cable and pulling said conduit along with said lashed cable from said other side to said one side, said communication cable connectable between a communication signal source and a building.

2. The method of claim 1 wherein said communication cable is fiber optic cable.

3. The method of claim 1 wherein the periphery of said output end of said conduit is rimmed with sharpened metal to permit ease of penetration into eroded soil of said pathway of erosion.

4. The method of claim 1 wherein said sufficient pressure is manually controllable so that a cable installer can increase or decrease said pressure in response to changing soil conditions along said pathway of erosion.

5. The method of claim 1 wherein said communication cable is insulated copper wire cable.

6. The method of claim 5 further comprising:
   disconnecting said source of water from said input end;
   not performing said feeding and, instead of said feeding, inserting one end of said insulated copper wire cable into said output end after said conduit emerges from said ground surface adjacent the other side of said obstruction, thereby permitting an installer to install said insulated copper wire cable underneath said obstruction in the opposite direction of said expected route by pushing said insulated copper wire cable through said conduit until it emerges from said input end, said copper wire cable connectible between a communication signal source and a building.

7. method of claim 6 wherein said conduit is removed from its location underground by pulling on its input end, leaving said insulated copper wire cable behind.

8. The method of claim 7 further comprising:
   forming two trenches in said ground surface, each said trench starting on an opposite side of said obstruction where said insulated copper wire cable emerges from said ground surface and extending in an opposite direction from the other said trench until respective underground destinations for said insulated copper wire cable are reached; and
   burying said insulated copper wire cable in said trench.

9. The method of claim 1 wherein:
   said source of water is a lawn-watering garden hose typically used by homeowners, said hose connected to a water supply; and
   said connecting is achieved by using a connector having a garden hose fitting on one end of the connector for connecting to the garden hose and a compression fitting on the other end of the connector for connecting to the input end of the conduit.

10. The method of claim 9 wherein said connector further comprises:
    a hand-operated valve for controlling, and/or turning-off, flow of water through said connector.

11. A method comprising:
    forcing water under high pressure through a continuous and flexible conduit having a permanent curve-bias curving said conduit, from an input of said conduit to an output of said conduit, said conduit having a circumferential grooved frictional surface on the outside of said conduit near said output of said conduit, said water being applied at said high pressure directly into ground surface located on one side of a surface-visible underground pathway obstruction to create an erosion pathway under said obstruction, said erosion pathway shaped similarly to shape of said curved conduit, said permanent curve bias being useful regarding distance of said erosion pathway, said distance being consistent with size of said obstruction, said erosion pathway emerging from ground surface located on the other side of said obstruction; and
    feeding a communication cable through said erosion pathway from said other side of said obstruction to said one side of said obstruction by lashing said grooved frictional surface fixedly to said cable and pulling said conduit along with said lashed cable front said other side to said one side, said communication cable connectable between a communication signal source and a building.

12. The method of said 11 wherein said surface-visible underground pathway obstruction is a sidewalk.

13. The method of claim 11 wherein said communication cable is a fiberoptic cable or a copper wire cable.

14. A method, comprising:
   facilitating underground installation of communication cable connectible between a communication signal source and a building by:
      connecting a controllable source of water to an input end of a continuous and flexible conduit having a circumferential grooved frictional surface on the outside of said conduit near an output end of said conduit for facilitating attachment of said cable and having a permanent curve-bias curving said conduit;
      placing said output end of said conduit at, and orienting said output end into, ground surface adjacent one side of an obstruction blocking a desired underground pathway for said underground installation;
      activating said controllable source of water to flow into said input end at water pressure which, if said input end water flow were instead flowing directly upon said ground, would be sufficient to cause erosion of said ground surface and ground beneath said ground surface, said water flowing out from said output end at substantially said pressure directly upon said ground;
      directing said conduit cause a pathway of said erosion of said ground beneath said ground surface to follow an expected route under said obstruction, said expected route being shaped similarly to shape of said curved conduit, said permanent curve-bias being useful regarding distance traversed underground, said distance being consistent with size of said obstruction, until said conduit emerges from said ground surface adjacent the other side of said obstruction;
      disconnecting said source of water from said input end;
      feeding said communication cable through said erosion pathway by either: (a) lashing said grooved frictional surface fixedly to said cable and pulling said conduit along with said lashed cable from said other side to said one side or by (b) feeding one end of said communication cable into said input end or said output end of said conduit while said conduit is positioned under said obstruction until said one end of said communication cable emerges from said output end or said input end, respectively; and
      if (b) is chosen, removing said conduit from under said obstruction leaving a portion of said cable in said expected route under said obstruction with said one end emerged from under said obstruction.

15. A method comprising:
   forcing water under high pressure through a continuous and flexible conduit having a circumferential grooved frictional surface on the outside of said conduit near an output end of said conduit and having a permanent curve-bias curving said conduit, said water forced directly onto ground surface located on one side of a surface-visible underground pathway obstruction;
   guiding said conduit to permit said high pressure water to create an erosion pathway under said obstruction, said erosion pathway being shaped similarly to shape of said curved conduit, said permanent curve bias being useful regarding distance traversed underground, said distance being consistent with size of said obstruction, said erosion pathway emerging from ground surface located on the other side of said obstruction, said conduit being pushed through said pathway as said pathway is created and emerging from said pathway on the other side of said obstruction after said pathway is created; and
   after disconnecting source of said water from said conduit, feeding a communication cable through said erosion pathway by lashing said grooved frictional surface fixedly to said cable and pulling said conduit along with said lashed cable from said other side to said one side.

16. The method of claim 15 wherein said cable is fiber optic cable or copper wire cable, connectible between a communication signal source and a building.

17. The method of claim 16 wherein said conduit is removed from underneath said obstruction prior to connecting said cable to said communication signal source.

* * * * *